United States Patent
Nowak et al.

(10) Patent No.: US 11,904,565 B2
(45) Date of Patent: Feb. 20, 2024

(54) FILLING UNIT AND METHOD FOR FILLING CAVITIES IN A TABLET PRESS WITH A FEEDSTOCK TO BE PRESSED AND MODULE FOR PRODUCING TABLETS

(71) Applicant: Glatt Maschinen- und Apparatebau AG, Pratteln (CH)

(72) Inventors: Reinhard Nowak, Loerrach (DE); Jochen Thies, Loerrach (DE)

(73) Assignee: Glatt Maschinen—und Apparatebau AG, Pratteln (CH)

( * ) Notice: Subject to any disclaimer, the term of this patent is extended or adjusted under 35 U.S.C. 154(b) by 435 days.

(21) Appl. No.: 16/982,618

(22) PCT Filed: Mar. 15, 2019

(86) PCT No.: PCT/EP2019/056585
§ 371 (c)(1),
(2) Date: Sep. 21, 2020

(87) PCT Pub. No.: WO2019/179896
PCT Pub. Date: Sep. 26, 2019

(65) Prior Publication Data
US 2021/0023807 A1    Jan. 28, 2021

(30) Foreign Application Priority Data
Mar. 22, 2018    (DE) ..................... 10 2018 204 440.6

(51) Int. Cl.
*B29C 43/08*    (2006.01)
*B29C 43/06*    (2006.01)
(Continued)

(52) U.S. Cl.
CPC .......... *B30B 15/302* (2013.01); *B30B 11/005* (2013.01); *B30B 11/08* (2013.01); *B29C 43/006* (2013.01); *B29C 43/06* (2013.01)

(58) Field of Classification Search
CPC ....... B29C 43/08; B29C 43/006; B29C 43/06; B30B 11/00; B30B 11/08; B30B 11/09; B30B 11/10; B30B 11/12; B30B 15/0023
See application file for complete search history.

(56) References Cited

U.S. PATENT DOCUMENTS

| 3,804,570 A | 4/1974 | Höschele et al. |
| 5,088,914 A | 2/1992 | Brambilla |

(Continued)

FOREIGN PATENT DOCUMENTS

| DE | 818450 C | 10/1951 |
| DE | 2157465 A1 | 6/1973 |

(Continued)

*Primary Examiner* — Thu Khanh T. Nguyen
(74) *Attorney, Agent, or Firm* — The Webb Law Firm

(57) ABSTRACT

A filling unit for filling cavities in a tablet press with a feedstock to be pressed, particularly a powder, having a filling assembly including a fill chamber. The fill chamber is arranged in the installed condition between a die table containing the cavities and a punch support including at least one punch. The fill chamber has at least one inlet opening for filling the fill chamber with raw material and at least one outlet opening for filling the cavities of the tablet press with feedstock to be pressed. The filling chamber has at least one mixer for mixing the raw materials of the feedstock to be pressed arranged at least partially in the fill chamber and at least one delivery unit for filling the cavities of the tablet press with feedstock to be pressed.

18 Claims, 4 Drawing Sheets

(51) Int. Cl.
    *B30B 15/30*     (2006.01)
    *B30B 11/00*     (2006.01)
    *B30B 11/08*     (2006.01)
    *B29C 43/00*     (2006.01)

(56) References Cited

U.S. PATENT DOCUMENTS

| | | | |
|---|---|---|---|
| 7,517,204 B2 * | 4/2009 | Mercado | B30B 11/007 |
| | | | 425/353 |
| 9,713,910 B2 | 7/2017 | Vanderbroucke et al. | |
| 9,902,087 B2 | 2/2018 | Ozeki et al. | |
| 10,449,701 B2 | 10/2019 | Kitamura et al. | |
| 2004/0131717 A1 * | 7/2004 | Shimada | B30B 15/065 |
| | | | 425/345 |
| 2014/0234463 A1 | 8/2014 | Ozeki et al. | |
| 2016/0361885 A1 | 12/2016 | Oyama et al. | |
| 2017/0087789 A1 * | 3/2017 | Ingo | B30B 15/302 |
| 2017/0282421 A1 | 10/2017 | Kitamura et al. | |
| 2017/0355162 A1 | 12/2017 | Oezcoban et al. | |
| 2018/0162023 A1 * | 6/2018 | Kitamura | B29C 43/08 |

FOREIGN PATENT DOCUMENTS

| | | |
|---|---|---|
| DE | 4437823 A1 | 4/1996 |
| EP | 2764989 A1 | 8/2014 |
| EP | 3225387 A1 | 12/2016 |
| EP | 3260286 A1 | 12/2017 |
| JP | S4837371 A | 6/1973 |
| JP | 2016523717 A | 8/2016 |
| JP | 2017030001 A | 2/2017 |
| WO | 2013051262 A1 | 4/2013 |
| WO | 2014207510 A1 | 12/2014 |

* cited by examiner

FILLING UNIT AND METHOD FOR FILLING CAVITIES IN A TABLET PRESS WITH A FEEDSTOCK TO BE PRESSED AND MODULE FOR PRODUCING TABLETS

CROSS-REFERENCE TO RELATED APPLICATIONS

This application is the United States national phase of International Application No. PCT/EP2019/056585 filed Mar. 15, 2019, and claims priority to German Patent Application No. 10 2018 204 440.6 filed Mar. 22, 2018, the disclosures of which are hereby incorporated by reference in their entirety.

FIELD OF THE INVENTION

The invention relates to a filling unit for filling cavities in a tablet press with a feedstock to be pressed, particularly a powder, having a filling assembly comprising a fill chamber, with the fill chamber being arranged in the installed condition between a die table containing the cavities and a punch support comprising at least one punch, and wherein the fill chamber has at least one inlet opening for filling the fill chamber with raw material and at least one outlet opening for filling the cavities of the tablet press with feedstock to be pressed.

The invention further relates to a method for filling cavities in a tablet press with a feedstock to be pressed, in particular a powder, with a filling unit for filling cavities in a tablet press with a feedstock to be pressed having a filling assembly comprising a fill chamber, wherein the fill chamber is arranged in an installed condition between a die containing the cavities and a punch support comprising at least one punch, and wherein the fill chamber has at least one inlet opening for filling the fill chamber with raw materials and at least one outlet opening for filling the cavities of the tablet press with feedstock to be pressed, wherein the fill chamber comprises at least one mixing unit, at least partially arranged in the fill chamber, for mixing the raw material of the feedstock to be pressed and at least one delivery unit for filling the cavities of the tablet press with feedstock to be pressed.

In addition, the invention relates to a module for producing tablets comprising a tablet press, a sensor positioned downstream of the tablet press, suitable for analyzing the tablets produced in the tablet press, and a control unit.

BACKGROUND

Tablets are one of the most common forms of administration of active pharmaceutical ingredients (API). A tablet generally consists of a mixture of a plurality of raw materials, in the form of a powder, preferably a powder mixture, namely the active pharmaceutical ingredients and non-active ingredients known as excipients. In tablet production it is crucial that the abovementioned powders are optimally mixed because only in this way can it be guaranteed that the intended dose of active pharmaceutical ingredient (API) and excipients are present in each tablet.

From the prior art it is known that the correct mixing necessary for tablet production can be achieved by granulation, wherein the granulation requires much energy and time and is therefore undesirable. In addition, currently the vast majority of tablets are not produced from granulates but preferably directly from powdered feedstock.

German patent application DE 2 157 465 A relates to a hydraulic block press for compacting powdery or fibrous materials under vacuum with at least two pressing containers serving as filling or pressing chambers pivotable about a common axis and a filling unit, and with compression pistons immersible in the compression chamber and an evacuation unit coaxially associated with this. Here, the filling unit is formed by a fixed filling tube arranged vertically in the axial direction on the supply side of the filling chamber, concentrically associated with a filling tube that is telescopically movable by means of a pressure cylinder. The filling of the feedstock takes place without air inclusion in that when the punch is lowered, the feedstock is sucked into the filling chamber under the simultaneous effect of gravity.

The disadvantage of gravity feeding of the feedstock into the pressing chamber of the hydraulic block press is that this can cause separation and segregation of the feedstock.

European patent application EP 3 260 286 A1 discloses a filling apparatus for filling cavities in a rotary press, comprising a filling material reservoir and a filling chamber that is connected to the filling material reservoir with a filling opening configured to dispense filling material into cavities in the rotary press, wherein a first rotatably driven stirrer blade wheel with one or more stirrer blades and a second rotatably driven stirrer blade wheel with one or more stirrer blades are arranged in the filling chamber, wherein first rotatably driven stirrer blade wheel has at least one of a different geometry, a different direction of rotation, or a different rotary speed, than the second rotatably driven stirrer blade wheel. By means of a feed section connected with the filling chamber, powdery feedstock is gravity fed from this into the filling chamber and from there via a filling opening arranged on the underside of the filling chamber, again by gravity, into the cavities of the die table.

The disadvantage of the abovementioned filling apparatus is that with powdered feedstock, in particular powder mixtures, as a result of the transport by gravity of the feedstock, in the cavities of the rotary tablet press, again, separation and segregation of the raw materials of the feedstock to be pressed can occur. Loosening the powdered feedstock prior to filling the cavities of the die table of the rotary tablet press does not lead to optimum mixing of the feedstock to be pressed.

SUMMARY OF THE INVENTION

The object of the invention to provide a filling unit and a method for filling cavities in a tablet press with a feedstock to be pressed and module for producing tablets, wherein separation and segregation effects of the raw materials of the feedstock as a result of the transport by gravity of the feedstock, for example in vertical feed lines, in the cavities of the die table of the tablet press are at least reduced, preferably even prevented.

This object is achieved with a filling unit of the abovementioned type in that the filling chamber has at least one mixing unit for mixing the raw materials of the feedstock to be pressed arranged at least partially in the filling chamber and at least one delivery unit for filling the cavities of the tablet press with feedstock to be pressed. The advantage of the filling unit according to the invention can be seen in that the feedstock to be pressed is always supplied optimally mixed, i.e. separation and/or segregation of the feedstock to be pressed is at least significantly reduced or completely prevented, to the delivery unit provided for filling the cavities of the die table of the tablet press. In addition, due to the design of the filling unit firstly investment costs are reduced and secondly the filling unit can be arranged in the immediate region of the tablet press. In addition, in this way a highly space-saving filling unit for a tablet press is created.

The filling assembly, in particular the filling chamber, preferably has a further inlet opening for the supply of separating agents and/or lubricants. Virtually all feedstocks that can be made into tablets, in particular powder mixtures, call for at least a small amount of separating agents and/or lubricants, such as for example magnesium stearate, in batch or continuous processes. The separating agents and/or lubricants are present in of the order of 0.5% to 1% of the feedstock to be filled in the cavities of the die table of the tablet press. The separating agents and/or lubricants ensure that following a pressing operation a tablet can be ejected without problems from the pressing tool. The separating agents and/or lubricants should preferably be mixed in as the final raw material for the feedstock. In addition, the separating agents and/or lubricants should be evenly distributed in the feedstock, in particular a powder mixture. An excessively intensive or long incorporation of the separating agents and/or lubricants should be prevented because the separating agents and/or lubricants separate the raw materials of the feedstock, in particular a powder mixture, from one another and therefore hinder tabletting. Preferably, for the addition of the separating agents and/or lubricants, therefore, a further inlet opening should be provided in the region of the mixing unit, most preferably on the end of the mixing unit, so that for the separating agents and/or lubricants a short dwell time in the region of the mixing unit and simultaneous optimum mixing with the raw materials of the feedstock, is ensured.

In addition, the filling assembly, in particular the filling chamber, preferably has at least one sensor. Particularly preferably, the at least one sensor is designed as a fill level sensor or as an analytical sensor, in particular for measuring the composition and/or mixing quality of the feedstock to be pressed and arranged in the filling chamber. In a preferred embodiment the at least one sensor is designed as a fill level sensor, so that at all times a constant amount of feedstock to be pressed is present in the filling chamber. By means of the fill level sensor arranged in the filling chamber the filling chamber is supplied from storage tanks, via feed lines, such as pipelines or hoses or similar, with the necessary amounts of each raw material. In a similarly preferred embodiment, the at least one sensor is designed as an analytical sensor, in particular for measuring the composition and/or the mixing quality of the feedstock to be pressed. By means of such a sensor a composition and/or mixing quality of the feedstock to be pressed that is optimal for a tabletting process is always ensured. According to a quite particularly preferred embodiment, the filling assembly, in particular the filling chamber, has two sensors, namely a fill level sensor and an analytical sensor, as a result of which the abovementioned advantages of the two individual sensors apply at the same time.

According to another advantageous design of the filling unit according to the invention, a mixer is arranged in a mixing unit. The mixer ensures good proper mixing of the raw materials supplied to the mixing unit into feedstock to be pressed, which is filled in cavities of the die table of the tablet press. Particularly preferably, the mixer of the mixing unit is designed as a screw mixer, as a ribbon blender or as a paddle mixer. Due to the particularly preferred design of the mixer as a screw mixer, as a ribbon mixer or also as a paddle mixer, optimum mixing of the raw materials of the feedstock to be pressed is ensured at all times in the overall process, but in particular in the mixing operation. Preferably the mixer is to be or is driven or drivable by a drive unit, preferably by a motor, quite particularly preferably by an electric motor, more preferably by a servo- or torque motor. In addition, the delivery unit is to be or is driven or drivable by a further drive unit, preferably by a motor, quite particularly preferably by an electric motor, more preferably by a servo- or torque motor. In addition, the mixer and the delivery unit are to be or are driven or drivable by a common drive unit, preferably by a motor, quite particularly preferably by an electric motor, more preferably by a servo- or torque motor. Advantageously, both the mixer and the delivery unit can be perfectly coordinated so that the mixer supplies only the quantity of filling material to be pressed, optimally mixed by the delivery unit, necessary for filling the cavities of the tablet press.

Preferably, the delivery unit for filling the cavities of the tablet press with feedstock to be and the mixing unit for mixing the raw materials lie in a horizontal plane. Advantageously, therefore, the filling chamber of the filling assembly of the filling unit has no vertical transport section. The feedstock to be pressed is therefore not subject to any transport by gravity.

In addition, the filling chamber of the filling assembly of the filling unit can, by way of example, be arranged in its entirety between a die table with the cavities and a punch support having at least one punch. In this way, a small and compact design of the filling chamber is achieved.

According to another advantageous design of the filling unit according to the invention, the at least one delivery unit for filling the cavities of the tablet press with feedstock to be mixed and the at least one mixing unit for mixing the raw materials are designed as a structural unit. A structural unit here means when delivery unit and mixer of the mixing unit form a single component. With such a design, a very compact, space-saving size of the combined mixing/delivery unit is achieved. Furthermore, such a combined mixing/delivery unit results in lower investment costs.

In addition, this object is achieved by a method of the abovementioned type, in that first a filling chamber is filled with raw materials, the raw materials are mixed by means of a mixer into feedstock to be pressed and then cavities of a die table are filled by means of a delivery unit with the feedstock to be pressed. The method according to the invention has the advantage that the feedstock is always optimally mixed for filling the cavities of the die table of the tablet press, as a result of which each tablet produced always contains the correct dose of active pharmaceutical ingredients, excipients and separating agents and/or lubricants. Correct dosing is of the utmost importance in tablet production, because if the dose is too high a patient taking the tablets could, by way of example, develop symptoms of poisoning or similar, and if it is too low the active pharmaceutical ingredient will not have its true effect.

All claims that depend on the filling unit can also be used for the method.

In a particularly preferred method variant, the separating agents and/or lubricants are added with and/or after supply of the raw materials in the filling chamber and prior to filling of the cavities of the die table. In this way, the important separating agents and/or lubricants are perfectly mixed into the raw materials without being able to have a segregating effect.

Quite particularly preferably, the sensors arranged in the filling chamber are continuously measuring. The advantage of continuous measurement is that at any point in the dwell time of the feedstock in the filling chamber of the filling unit according to the invention, the process conditions are captured and thus the direct influence on the process can be detected of, for example, the addition of the raw materials necessary for a perfect powder mixture.

The object is achieved by a module of the abovementioned type in that the module has at least one module component arranged upstream of the tablet press, wherein a module component is designed as a filling unit for filling cavities in a tablet press with a feedstock to be pressed having a filling assembly comprising a fill chamber, wherein the fill chamber is arranged in an installed condition between a die containing the cavities and a punch support comprising at least one punch, and wherein the fill chamber has at least one inlet opening for filling the fill chamber with raw materials and at least one outlet opening for filling the cavities of the tablet press with feedstock to be pressed, wherein the fill chamber comprises at least one mixing unit, at least partially arranged in the fill chamber, for mixing the raw material of the feedstock to be pressed and at least one delivery unit for filling the cavities of the tablet press with feedstock to be pressed, the control unit for sending and receiving signals is connected at least with a module component and the sensor and the control unit is suitable by means of the signals received from the sensor, of controlling and/or regulating at least one module component arranged upstream of the tablet press. Such a module has the advantage that due to the feedback from the sensor arranged after the tablet press the lead times can be considerably reduced, allowing removal of the tablets to be discarded.

All claims that depend on the filling unit can also be used for the module.

BRIEF DESCRIPTION OF THE DRAWINGS

The invention is explained in more detail below with reference to the attached drawings. In which.

DETAILED DESCRIPTION

Figure 1:
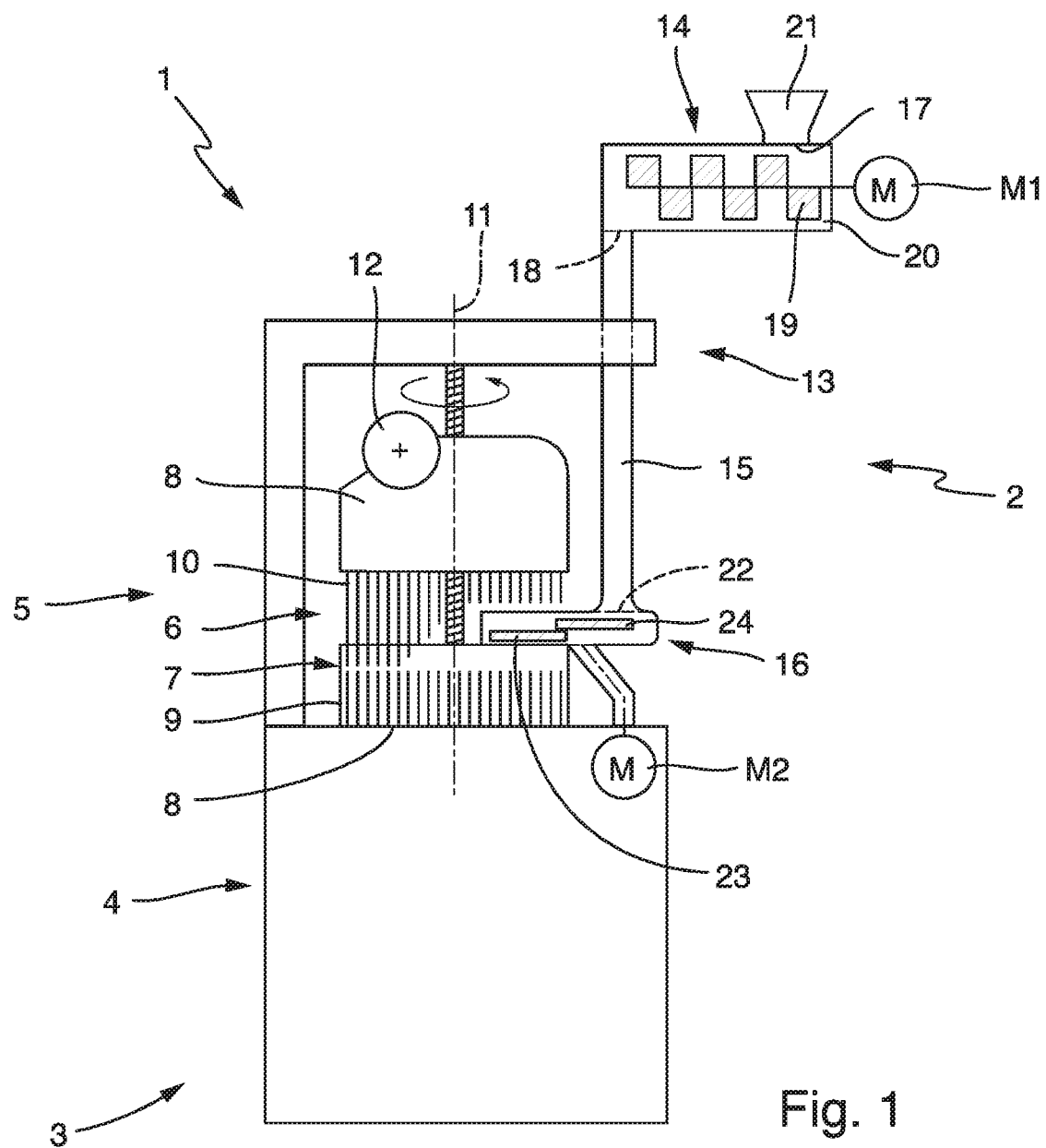
FIG. 1 is a schematic representation of a module with a filling unit for continuous tablet production with a conventional tablet press according to the prior art.

FIG. 1 is a highly schematized representation of a module 1 with a filling unit 2 for continuous tablet production with a conventional tablet press 3 according to the prior art.

The tablet press 3 has a substructure 4 and a superstructure 5. The substructure 4 comprises, inter alia, by way of example the entire control unit of the tablet press 3 and further equipment items necessary for the operation of the tablet press 3. The superstructure 5 of the tablet press 3 comprises, inter alia, a rotor 6, having a die table 7 with cavities—not shown here—in it. In addition, the rotor 6 comprises at least one punch support 8 with a guide curve, having lower punch 9 and upper punch 10, wherein the lower punch 9 and upper punch 10 are in each case associated with the cavities of the die table of the tablet press 3. The die table 7 and the rotor 6 comprising at least one punch support 8 is arranged rotatably about an axis 11, wherein the rotor 6 is rotated by a drive unit, not shown here, which is for example built into the substructure 4. In addition, the rotor 6 is furthermore associated with at least partially shown pressure rollers 12, which control the lower punch 9 or upper punch 10 according to the guide curve and in this way press feedstock to be pressed contained in cavities of the die table 7 of the tablet press 3 into tablets.

In order that tablets can be pressed in the tablet press 3 from feedstock to be pressed it is necessary that the cavities, not shown here, of the die table 7 are filled with the feedstock to be pressed. To this end, the module 1 has a filling unit 2.

The filling unit 2 comprises a filling assembly 13 with a mixing unit 14, a vertically arranged connection line 15 and a filling chamber 16.

The mixing unit 14 is arranged above the tablet press 3 and outside the superstructure 5 of the tablet press 3. In addition, apart from an inlet opening 17 and an outlet opening 18 the mixing unit 14 has a mixing chamber 20 comprising a mixer 19. The mixer 19 arranged in the mixing chamber 20 is driven via a first drive unit M1. The raw materials to be mixed are supplied to the mixing chamber 20 of the mixing unit 14 via feed lines 21. The raw materials supplied to the mixing unit 14 via feed lines 21 are mixed with each other in the mixing chamber 20 by the mixer 19 into the feedstock to be pressed and leave the mixing chamber 20 of the mixing unit 14 via the outlet opening 18 of the mixing unit 14.

The feedstock leaving the mixing chamber 20 via the outlet opening 18 of the mixing unit 14 is supplied to the filling chamber 16 via an at least partially vertical connection line 15. In this way the feedstock to be pressed reaches the filling chamber 16 via a drop section, wherein in the connection line 15 in the drop section between the mixing chamber 20 of the mixing unit 14 and the filling chamber 16 separation and segregation occurs.

Apart from an inlet opening 22 for filling the filling chamber 16 with feedstock to be pressed, the filling chamber 16 has at least one outlet opening 23 for filling the cavities of the die table 7 of the tablet press 3 with feedstock to be pressed. In the filling chamber 16 a delivery unit 24 is arranged, which fills the segregated feedstock to be pressed evenly in the cavities of the die table 7 of the tablet press 3. The delivery unit 24 is driven via a drive unit M2.

Figure 2:
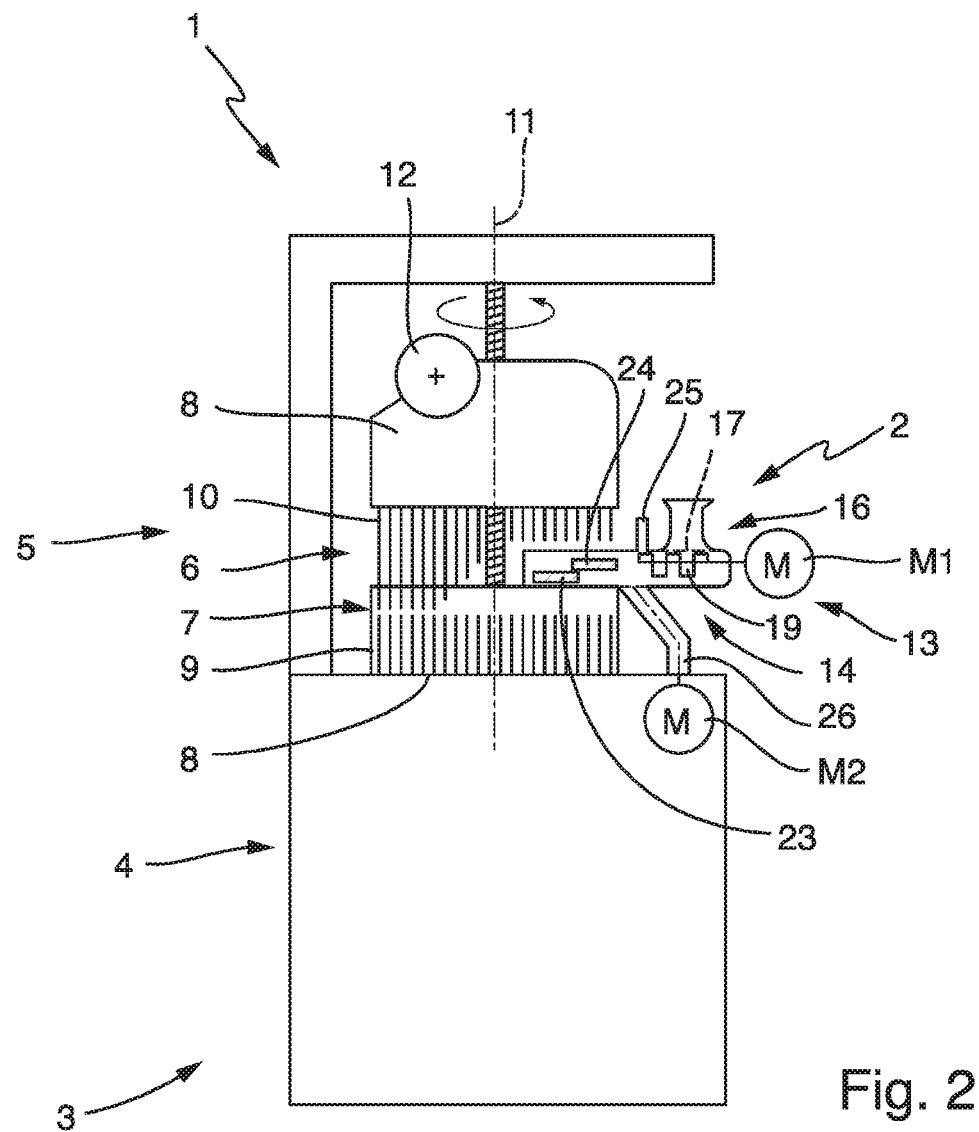
FIG. 2 is a schematic representation of a module with a filling unit according to the invention for continuous tablet production with a conventional tablet press.

FIG. 2 is a highly schematized representation of a module 1 with a filling unit 2 according to the invention for continuous tablet production with a conventional tablet press 3. Here, the tablet press 3 of the module 1 has the same design as the tablet press 3 already illustrated in FIG. 1.

The filling unit 2 has a filling assembly 13, comprising a filling chamber 16 with at least one inlet opening 17 for filling the filling chamber 16 with raw materials and at least one outlet opening 23 for filling the cavities of the die table 7 of the tablet press 3. Here, the filling chamber 16 is spatially divided into two parts, namely a mixing unit 14 and a part comprising the delivery unit 24. The filling chamber 16 of the filling assembly 13 of the filling unit 2 further comprises a mixing unit 14 arranged at least partially in the filling chamber 16 with a mixer 19 for mixing the raw materials of the feedstock to be pressed and at least one delivery unit 24 for filling the cavities of the die table 7 of the tablet press 3 with feedstock to be pressed, wherein the delivery unit 24 is arranged in the second part of the filling chamber 16.

The mixing unit 14 of the filling unit 2 shown in FIG. 2 has a mixer 19, which ensures perfect blending or mixing of the raw materials supplied to the mixing unit 14 into feedstock to be pressed, that is filled in cavities of the die table of the tablet press. Particularly preferably, the mixer 19 of the mixing unit 14 is designed as a screw mixer, a ribbon blender or a blade mixer, as shown in FIG. 2. The preferred embodiments of the mixer 19, namely screw mixer, ribbon blender and blade mixer ensure optimum mixing of the raw materials of the feedstock to be pressed at all times in the overall process, but in particular the mixing operation in the mixing unit 14. FIG. 2 shows the mixer 19, in particular a mixer, driven by a drive unit M1, preferably by a motor, quite particularly preferably by an electric motor, more preferably by a servo- or torque motor.

The delivery unit 24, arranged in a second part of the filling chamber 16, for filling the cavities of the die table 7 of the tablet press 3 with the perfectly blended or mixed feedstock is driven by at least one drive 26 of a further drive unit M2, preferably by a motor, quite particularly preferably by an electric motor, more preferably by a servo- or torque motor.

The delivery unit 24 for filling the cavities of the die table of the tablet press 3 with feedstock to be pressed, driven by at least one shaft 26 of a drive unit M2, and the mixing unit 14 for mixing the raw materials are arranged in FIG. 2 in a horizontal plane. However, other embodiments are conceivable wherein the delivery unit 24 and the mixing unit 14 do not lie in a horizontal plane. As a result of this, the filling chamber 16 of the filling assembly 13 of the filling unit 2 has no vertical transport section and the feedstock to be pressed is not subject to any transport by gravity. Thus, the occurrence of separation and/or segregation in the feedstock of the filling unit 2 according to the invention is significantly reduced or even completely prevented.

The feedstock to be pressed in the filling unit 2 according to the invention is always optimally blended or mixed in the filling chamber 16, i.e. separation and/or segregation of the feedstock to be pressed is at least significantly reduced or even completely avoided, and supplied in a state of optimum blending or mixing to delivery unit 24 provided for filling the cavities of the die table of the tablet press 3. Due to its small and compact design, the filling unit 2 according to the invention considerably lowers investment costs and also allows as a further advantage installation near to the tablet press in the module 1.

In addition, the filling chamber 16 of the filling assembly 13 of the filling unit 2 in FIG. 2 is arranged in its entirety between a die table 7 with the cavities and a punch support 8 with at least one punch 9, 10. In this way, a very small and compact design of the filling chamber 16 is achieved.

Moreover, the filling assembly 13 of the filling unit 2, in particular the filling chamber 16, has a further inlet opening 25 for raw materials, in particular for the supply of separating agents and/or lubricants. Separating agents and/or lubricants, such as for example magnesium stearate, are added to almost all feedstocks that can be made into tablets, in particular powder mixtures since, in batch or continuous processes at least, they are necessary at least in small amounts. Here, the separating agents and/or lubricants are present in an order of magnitude of 0.5 vol.-% to 1 vol.-% of the feedstock.

The separating agents and/or lubricants ensure that following a pressing operation a tablet can be ejected without problems from the pressing tool of the tablet press 3, in particular the die table 7. The separating agents and/or lubricants should preferably be mixed in as the final raw material for the feedstock. In addition, the separating agents and/or lubricants should be evenly distributed in the feedstock, in particular a powder mixture. An excessively intensive or long incorporation of the separating agents and/or lubricants should be prevented because the separating agents and/or lubricants separate the raw materials of the feedstock, in particular a powder mixture, from one another and therefore hinder tabletting. Preferably, for the addition of the separating agents and/or lubricants, therefore, a further inlet opening 25 should be provided in the region of the mixing unit 14, so that a short dwell time of the separating agents and/or lubricants in the region of the mixing unit 14 is ensured with simultaneous optimum mixing with the raw materials of the feedstock.

Figure 3:
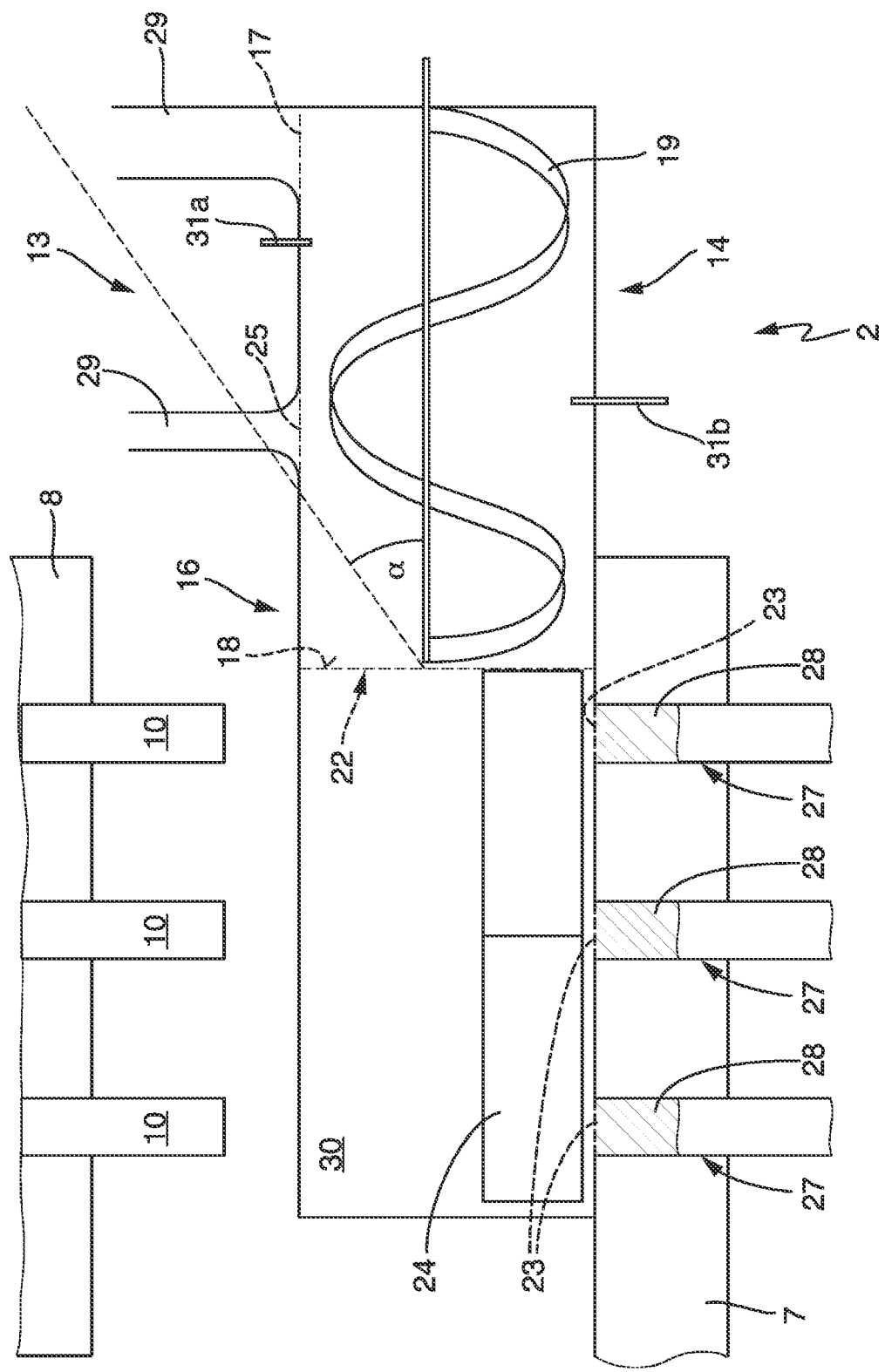
FIG. 3 is a schematic representation of a filling unit according to the invention arranged between a die table with cavities and a punch support and FIG. 4 is a basic flow chart of a module for producing tablets.

FIG. 3 shows a schematic representation of a filling unit 2 according to the invention arranged between a die table 7 with cavities 27 and a punch support 8 with an upper punch 10. The filling unit 2 designed as a filling assembly 13 has the inlet opening 17 for the filling chamber 16, wherein the filling chamber 16 comprises a mixing unit 14 for optimum blending or mixing of the raw materials of the feedstock 28 and a delivery unit 24 arranged in a second part of the filling chamber 16 for filling the cavities 27 of the die table 7 of the tablet press 3 via at least one outlet opening 23. In addition, the filling chamber 16 has an inlet opening 25 for separating agents and/or lubricants. Both the raw materials and the separating agents and/or lubricants are transported by means of lines 29, in particular pipelines or hoses, via the inlet openings 17 or 25 in storage tanks not shown here to the filling chamber 16.

The mixing unit 14 has a mixer 19, designed as a ribbon blender. In this way, an optimum blending or mixing of the raw materials of the feedstock to be pressed 28 is achieved. The mixer 19 designed as a ribbon is driven by a drive unit M1 not shown here. The delivery unit 24 for filling the cavities 27 of the die table 7 of the tablet press 3 arranged in a second part 30 of the filling chamber 16 is driven by a further drive unit M2, not shown. In FIG. 3, mixer 19 and delivery unit 24 lie in a horizontal plane. The outlet opening 18 of the mixing unit 14 and the inlet opening 22 of the second part 30 of the filling chamber 16 correspond here. In a quite particularly preferred embodiment, not shown here, of the filling unit 2 according to the invention, the mixer 19 and the delivery unit 24 are driven by a common drive unit M, preferably by a motor, quite particularly preferably by an electric motor, more preferably by a servo- or torque motor. Advantageously, both the mixer 19 of the mixing unit 14 and the delivery unit 24 are perfectly coordinated with one another, so that the mixer 19 supplies only the necessary quantity, optimally mixed by the delivery unit 24, of feedstock 28 to be pressed for filling the cavities 27 of the die table 7 of the tablet press 3.

In addition, it is possible for the mixing unit 14 with the mixer 19 to be at an angle $\alpha$ to the part 30 of the filling chamber 16 comprising the delivery unit 24. The positive angle $\alpha$ in FIG. 3 can also be configured to be negative, so that the mixing unit 14 is inclined towards the die table 7 of the tablet press 3.

The filling assembly 13 of the filling unit 2 shown in FIG. 3, in particular the filling chamber 16, has at least one sensor 31. The sensor 31 is preferably arranged in the mixing unit 14 and designed as a fill level sensor 31$a$ and as an analytical sensor 31$b$, in particular for measuring the composition and/or mixing quality of the feedstock to be pressed 28. The fill level sensor 31$a$ is preferably designed as an optical sensor or ultrasound sensor, so that the fill level of the mixing unit 14 is continuously determined and thus a constant amount of feedstock to be pressed 28 is present in the filling chamber 16. By means of the fill level sensor 31$a$ arranged in the filling chamber 16 the filling chamber 16 is supplied via the lines 29, such as pipelines or hoses or similar, from storage tanks, not shown, with the necessary amounts of the respective raw material, namely pharmaceutically active substances, excipients or separating agents and/or lubricants. Raw materials can also be supplied premixed. In a similarly preferred embodiment, the at least one sensor 31 is designed as an analytical sensor 31b, in particular for measuring the composition and/or the mixing quality of the feedstock to be pressed 28. By means of such a sensor 31b a composition and/or mixing quality of the feedstock 28 to be pressed that is optimum for a tabletting process is always ensured. The use of further sensors 31, such as for example thermal sensors for temperature-sensitive feedstock, is conceivable. The advantage of such continuous measurement is that at any point during the dwell time of the feedstock 28 in the filling chamber 16 of the filling unit 2 according to the invention, the process conditions are captured and thus the direct influence on the process can be detected.

In the method according to the invention for filling cavities 27 of a die table 7 of a tablet press 3 with feedstock to be pressed 28, in particular a powder, with a filling unit 2 according to the invention, first a filling chamber 16 is filled via feed lines 29 with raw materials. The raw materials are active pharmaceutical ingredients (API), non-active ingredients (excipients) and separating agents and/or lubricants. The raw materials are mixed in the filling chamber 16 by means of a mixer 19 into feedstock to be pressed 28, wherein between the supply of the raw materials and the filling of the cavities 27 of the die table 7 optionally further raw materials, in particular separating agents and/or lubricants, are added. After thorough mixing of the feedstock 28 containing the raw materials and the separating agents and/or lubricants this is then filled via the outlet openings 23 into cavities 27 of a die table 7 of the tablet press 3 by means of a delivery unit 24.

Figure 4:
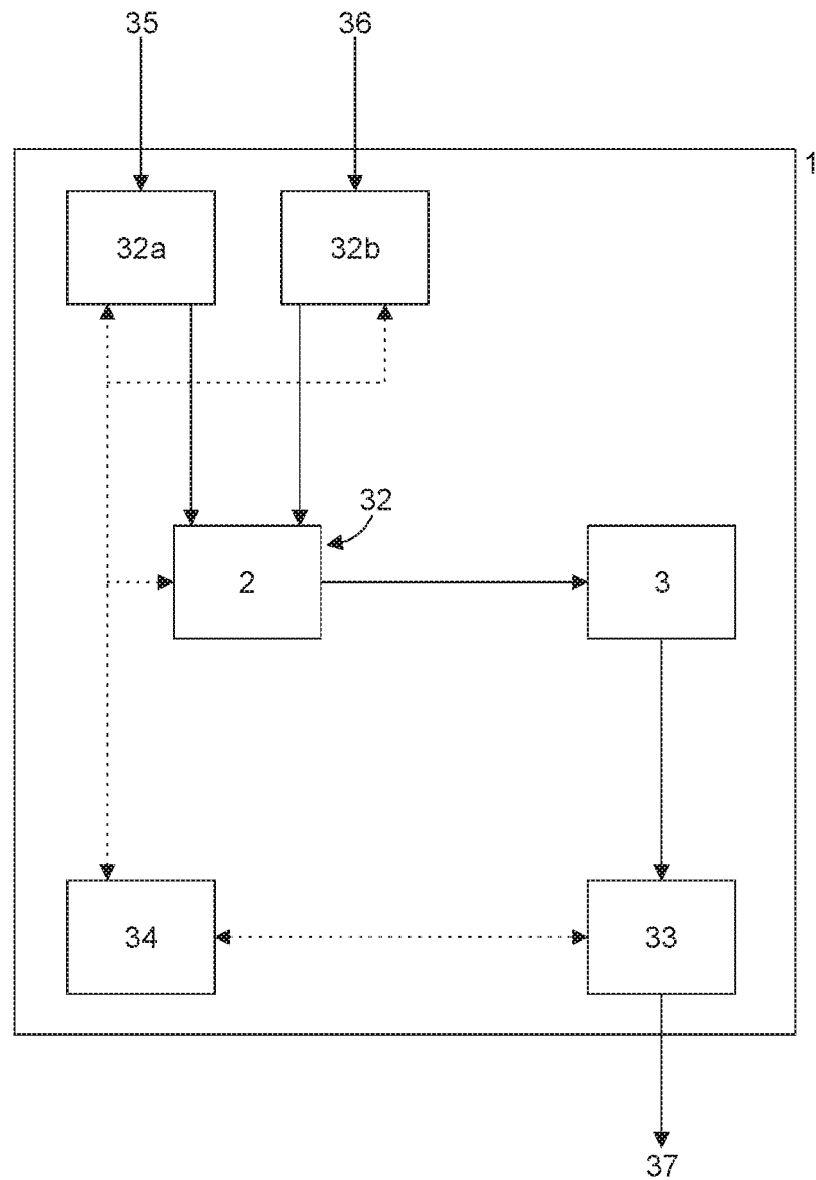

FIG. 4 shows a module 1 for producing tablets comprising a tablet press 3, module components 32 positioned upstream of the tablet press 3, a sensor 33 positioned downstream of the tablet press 3, suitable for analyzing the tablets produced in the tablet press 3, and a control unit 34.

One of the module components 32 is designed as a filling unit 2. Further module components 32 are in particular metering units for active substances, non-active ingredients or lubricants and separating agents, such as fluid bed dryers, or granulators. In the exemplary embodiment, the further module units 32 are designed as metering units 32a for an active substance and metering unit 32b for a non-active ingredient.

The metering unit 32a is filled via a feed 35 with active substance, and the metering unit 32b is filled via a feed 36 with non-active ingredient. The metering units 32a and 32b load the filling unit 2 with active substance and non-active ingredient in the corresponding ratio necessary for producing the tablets.

As already explained above, the cavities 27 of the tablet press 3 are then filled by the filling unit 2 with the feedstock to be pressed. The tablet press 3 produces tablets from the material to be pressed. These are then analyzed by the sensor 33. The tablets then leave the module 1 via an outlet 37 of the module 1.

In the exemplary embodiment of FIG. 4, the module components 32 of the module 1 and the sensor 33 are connected to the control unit 33, in particular a computer or similar, for the transmission and reception of signals. The control unit 33 is connected to at least one module component 32. The measurement data captured by the sensor 33 are transmitted as signals to the control unit 34 and evaluated there, and a signal is transmitted to the at least one module component 32, in order to control and/or regulate at least one module component 32 arranged upstream of the tablet press 3. The sensor 32 suitable for analysis of the tablets produced in the tablet press 3 serves as a quality control instance for the product quality of the tablets. In particular, such sensors 32, are for example near-infrared spectroscopy (NIR) sensors for measuring a uniform mixture (blend uniformity/content uniformity), or other sensors for measuring for example the grain size of the raw materials, the morphological form, size and/or breaking strength of the tablets produced.

Such a module 1 has the advantage that due to the feedback from the sensor 33 arranged after the tablet press 3 the lead times can be considerably reduced, allowing removal of the tablets to be discarded.

The invention claimed is:

1. A filling unit for filling cavities in a tablet press with a feedstock to be pressed, the filling unit having a filling assembly comprising a fill chamber,
   wherein the fill chamber is arranged in an installed condition between a die containing the cavities and a punch support comprising at least one punch,
   wherein the fill chamber has at least one inlet opening for filling the fill chamber with raw materials and at least one outlet opening for filling the cavities of the tablet press with feedstock to be pressed,
   wherein the fill chamber comprises at least one mixing unit for mixing the raw material of the feedstock to be pressed and at least one delivery unit for filling the cavities of the tablet press with feedstock to be pressed,
   wherein the at least one mixing unit and the at least one delivery unit are arranged in an installed condition between the die containing the cavities and the punch support comprising the at least one punch,
   wherein the delivery unit for filling the cavities of the tablet press with feedstock to be pressed and the mixing unit for mixing the raw material lie in a horizontal plane, and
   wherein the at least one delivery unit is located downstream of the at least one mixing unit.

2. The filling unit according to claim 1, wherein the filling assembly has a further inlet opening for the supply of separating agents and/or lubricants.

3. The filling unit according to claim 1, wherein the filling assembly has at least one sensor.

4. The filling unit according to claim 3, wherein the at least one sensor is a fill level sensor or an analytical sensor.

5. The filling unit according to claim 4, wherein the analytical sensor is configured for measuring the composition and/or the mixing quality of the feedstock to be pressed.

6. The filling unit according to claim 1, wherein a mixer is arranged in the at least one mixing unit.

7. The filling unit according to claim 6, wherein the mixer of the mixing unit is a screw mixer, a ribbon blender, or a paddle mixer.

8. The filling unit according to claim 1, wherein the mixing unit is configured to be driven by a drive unit.

9. The filling unit according to claim 8, wherein the drive unit is a servo or torque motor.

10. The filling unit according to claim 1, wherein the delivery unit is configured to be driven by a further drive unit.

11. The filling unit according to claim 10, wherein the further drive unit is a servo or torque motor.

12. The filling unit according to claim 1, wherein the mixing unit and the delivery unit are configured to be driven by a common drive unit.

13. The filling unit according to claim 12, wherein the common drive unit is a servo or torque motor.

14. The filling unit according to claim 1, wherein the at least one delivery unit for filling the cavities of the tablet press with feedstock to be pressed and the at least one mixing unit for mixing the raw materials are designed as a structural unit.

15. A method for filling cavities in a tablet press with a filling unit having a filling assembly comprising a fill chamber, wherein the fill chamber is arranged in an installed condition between a die containing the cavities and a punch support comprising at least one punch, and wherein the fill chamber has at least one inlet opening for filling the fill chamber with raw materials and at least one outlet opening for filling the cavities of the tablet press with feedstock to be pressed, wherein the fill chamber comprises at least one mixing unit for mixing the raw material of the feedstock to be pressed and at least one delivery unit for filling the cavities of the tablet press with feedstock to be pressed, wherein the at least one mixing unit and the at least one delivery unit are arranged in an installed condition between the die containing the cavities and the punch support comprising the at least one punch, and wherein the delivery unit for filling the cavities of the tablet press with feedstock to be pressed and the mixing unit for mixing the raw material lie in a horizontal plane, and wherein the at least one delivery unit is located downstream of the at least one mixing unit, the method comprising:

filling the fill chamber with raw materials, mixing the raw materials by means of the mixing unit into feedstock to be pressed, and filling cavities of a die table of the tablet press by means of the delivery unit with the feedstock to be pressed.

16. The method according to claim 15, wherein separating agents and/or lubricants are added with and/or after supply of the raw materials in the fill chamber and prior to filling of the cavities of the die table.

17. The method according to claim 15, wherein sensors arranged in the fill chamber are continuously measuring.

18. A module for producing tablets, comprising: a tablet press, a sensor positioned downstream of the tablet press suitable for analyzing the tablets produced in the tablet press, and a control unit, wherein the module has at least one module component arranged upstream of the tablet press, wherein the module component is a filling unit for filling cavities in a tablet press with a feedstock to be pressed having a filling assembly comprising a fill chamber, wherein the fill chamber is arranged in an installed condition between a die containing the cavities and a punch support comprising at least one punch, and wherein the fill chamber has at least one inlet opening for filling the fill chamber with raw materials and at least one outlet opening for filling the cavities of the tablet press with feedstock to be pressed, wherein the fill chamber comprises at least one mixing unit for mixing the raw material of the feedstock to be pressed and at least one delivery unit for filling the cavities of the tablet press with feedstock to be pressed, wherein the at least one mixing unit and the at least one delivery unit are arranged in an installed condition between the die containing the cavities and the punch support comprising the at least one punch, wherein the delivery unit for filling the cavities of the tablet press with feedstock to be pressed and the mixing unit for mixing the raw material lie in a horizontal plane, and wherein the at least one delivery unit is located downstream of the at least one mixing unit, the control unit for sending and receiving signals is connected at least with a module component and the sensor, and the control unit is suitable by means of the signals received from the sensor, of controlling and/or regulating at least one module component arranged upstream of the tablet press.

\* \* \* \* \*

UNITED STATES PATENT AND TRADEMARK OFFICE
CERTIFICATE OF CORRECTION

| | | |
|---|---|---|
| PATENT NO. | : 11,904,565 B2 | Page 1 of 1 |
| APPLICATION NO. | : 16/982618 | |
| DATED | : February 20, 2024 | |
| INVENTOR(S) | : Nowak et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this
Twelfth Day of August, 2025

Coke Morgan Stewart
*Acting Director of the United States Patent and Trademark Office*